United States Patent [19]

D'Hont

[11] Patent Number: 4,639,765

[45] Date of Patent: Jan. 27, 1987

[54] SYNCHRONIZATION SYSTEM FOR OVERLAY OF AN INTERNAL VIDEO SIGNAL UPON AN EXTERNAL VIDEO SIGNAL

[75] Inventor: Lodewijk J. D'Hont, Zwolle, Netherlands

[73] Assignee: Texas Instruments Incorporated, Dallas, Tex.

[21] Appl. No.: 706,690

[22] Filed: Feb. 28, 1985

[51] Int. Cl.$^4$ .................................................. H04N 9/455
[52] U.S. Cl. ....................................... 358/19; 358/22; 358/27; 358/149
[58] Field of Search .................... 358/19, 22, 149, 158, 358/27

[56] References Cited

U.S. PATENT DOCUMENTS

| | | | |
|---|---|---|---|
| 4,346,407 | 8/1982 | Baer | 358/149 |
| 4,374,395 | 2/1983 | Herrmann et al. | 358/22 |
| 4,425,581 | 1/1984 | Schweppe | 358/149 |
| 4,498,098 | 2/1985 | Stell | 358/22 |
| 4,554,582 | 11/1985 | Wine | 358/148 |
| 4,561,013 | 12/1985 | Fukui | 358/22 |

OTHER PUBLICATIONS

D. H. Pritchard, "U.S. Color Television Fundamentals-A Review", *IEEE Transactions on Consumer Electronics*, vol. CE-23, No. 4, Nov. 1977.

*Primary Examiner*—Michael A. Masinick
*Attorney, Agent, or Firm*—Robert D. Marshall, Jr.

[57] ABSTRACT

The present invention is manner of synchronization in a video overlay system for overlay of an internal video signal upon an external video signal. In the video overlay system of the present invention the horizontal synchronization pulses of the external video signal are detected to enable generation of the internal video signal having synchronized horizontal lines. This is achieved by generating a video clock signal for control of video signal generation at a frequency that is a multiple of the frequency of the horizontal lines of the external video signal. The vertical synchronization signal of the external video signal is detected in the preferred embodiment to enable generation of the internal video signal having video frames in synchronism with those of the external video signal. In order to insure further stability in the combined video signal, the color burst signal of the external video signal is detected for control of the frequency, phase and amplitude of the color modulation of the internal video signal. Loss of the external video signal for more than a predetermined number of lines causes the overlay system to switch to an internal signal only mode. Return to the external video signal upon its restoration is delayed until the internal and external signals are resynchronized, thereby preventing picture instability.

20 Claims, 5 Drawing Figures

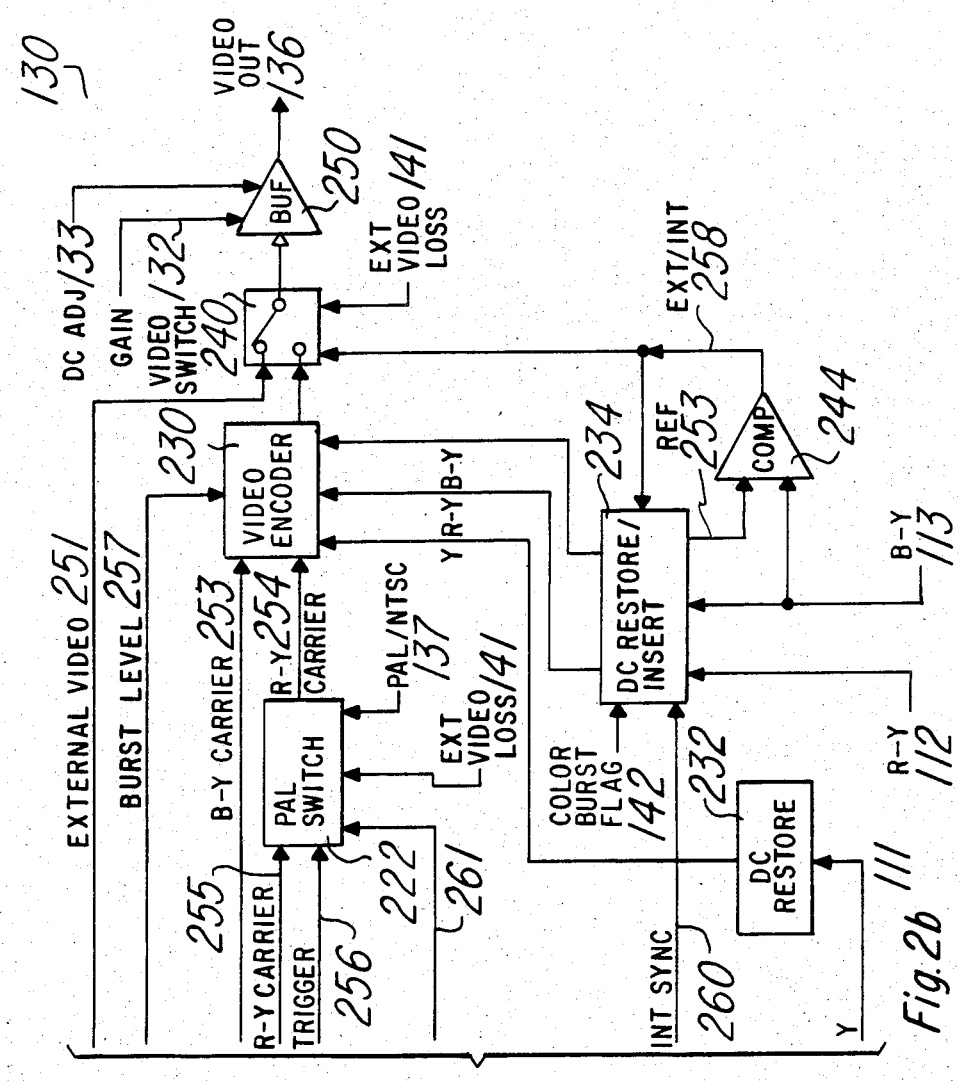

SYNCHRONIZATION SYSTEM FOR OVERLAY OF AN INTERNAL VIDEO SIGNAL UPON AN EXTERNAL VIDEO SIGNAL

BACKGROUND OF THE INVENTION

The present invention relates to systems which combine video signals from an internal source and from an external source. Systems of this type are useful in computer controlled instruction systems and computer controlled game systems with high quality graphics. Such a system enables a combination of high quality graphics with user interaction. The high quality graphics can be derived from previously known video systems such as broadcast television, video disks or video tape recorders. These video systems are capable of generating high quality displays but are capable of only limited user interaction. On the other hand, computer controlled video graphics can be highly user interactive. However, it is extremely difficult and expensive to generate computer graphics of the same quality as is possible from the above mentioned video sources. Therefore, a combination of an externally generated video signal from a video source and a computer generated video signal appearing on the same video monitor could enable the best of each of these types.

The overlay of a computer generated video signal upon a video signal from another source involves the rapid switching from these two sources during a single horizontal line. It is understood by those skilled in the art that the two video sources must be properly synchronized both in horizontal lines and in vertical frames in order to minimize the flicker or movement of images on the video monitor. Only if the two video sources are phase synchronized will the picture on the video monitor be free from flicker, rolling or distorted images.

In the field of the present invention, a computer generated internal video signal is overlaid upon an external video signal coming from a source not under control of the computer. In such a case, the computer generated signal must be synchronized to the external signal. This task is relatively easy if a perfect external video signal is received. However, problems occur when the external signal is less than perfect, that is when it includes time base errors, possible signal loss and possible color loss. In such an event, it is difficult to cause the internally generated video signal to follow the external signal in order to provide a stable display at the video monitor.

SUMMARY OF THE INVENTION

It is the object of the present invention to enable the overlay of an internal video signal over an external video signal with a minimum of adverse effects on the resulting combined video image. In accordance with the principles of the present invention the internal video signal is controlled to have horizontal lines in phase synchronization with the horizontal lines of the external video signal.

In the preferred embodiment of the present invention, this phase synchronization is achieved by generating a video clock signal having a frequency which is a predetermined multiple of the horizontal line rate of the external video signal. This video clock enables generation of horizontal lines which have a predetermined phase relation to the external video signals. The desired frequency relationship is achieved in the preferred embodiment through the use of phase locked loops with a divider to set the predetermined multiple.

In the preferred embodiment of the present invention the frames of the internal video signal are phase synchronized with the frames of the external video signal. This is achieved by detecting the vertical reset pulses of the external video signal and resetting the video generator when such external video signal vertical reset pulses are received.

In the preferred embodiment of the present invention, the frequency, phase and amplitude of the color burst signal of the external video signal is detected. These attributes of the color burst signal are employed to condition the color signals of the internal video signal for further assurance that the internal video signal matches the characteristics of the external video signal. This includes the elimination of any color attributes from the internal video signal whenever the color burst of the external signal is absent or below a predetermined level, thereby making both video signals monochrone.

A further aspect of the preferred embodiment of the present invention is to switch to an internal only mode of operation upon loss of the external video signal. Through the use of oscillators synchronized with the external video signal and a stable frequency standard, the internal video signal can be generated in a manner nearly synchronized with the external video signal during periods of temporary loss of the external video signal. This feature advantageously also includes the resyncnronization of the internal and external video signals prior to return to external mode when the external video signal is restored. By this means maximum picture stability is assured during times of temporary loss and return of the external video signal.

BRIEF DESCRIPTION OF THE DRAWINGS

Various aspects of the present invention including the manner of construction and operation will be explained below in conjunction with the drawings, in which.

DETAILED DESCRIPTION OF THE PREFERRED EMBODIMENT

Figure 1:
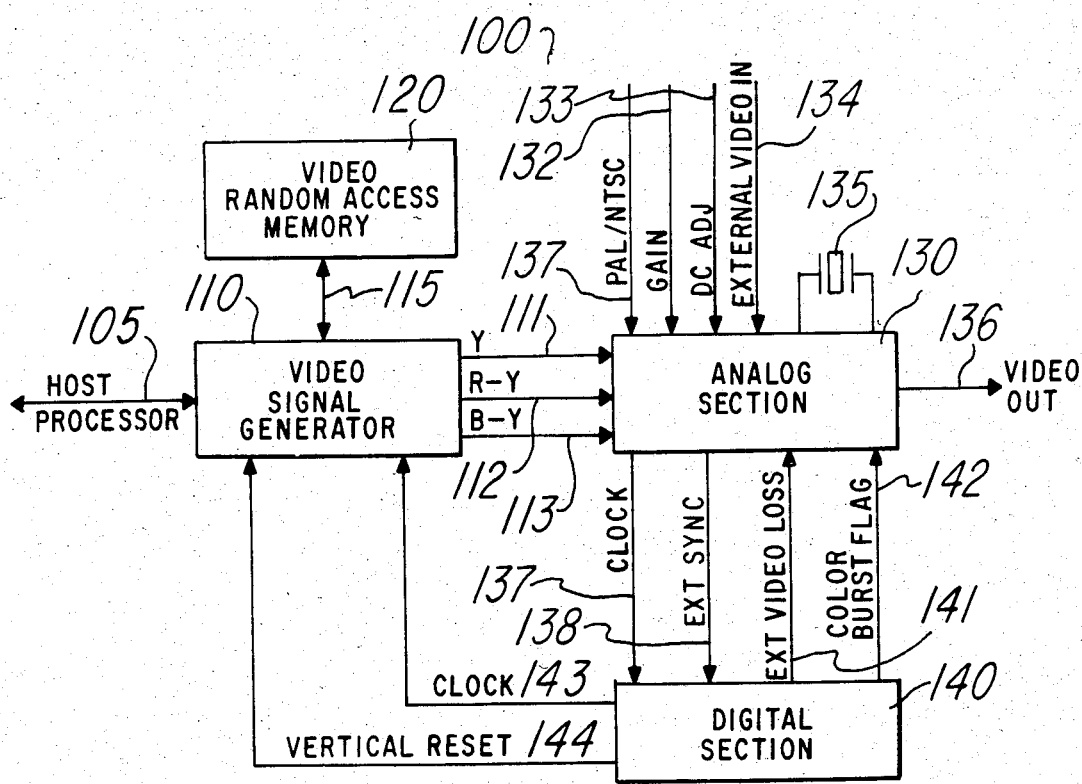
FIG. 1 illustrates an overall system block diagram of the synchronization of the present invention.

FIG. 1 illustrates overlay synchronization system 100. The overlay synchronization system 100 includes video signal generator 110, video random access memory 120, analog section 130 and digital section 140. Overlay synchronization system 100 receives control and data signals from a host processor along bus 105 and further receives an external video input signal 134. These parts operate together to generate a combined video output signal 136 which is a combination of the external video input signal 134 and a computer generated signal formed by video signal generator 110.

Video signal generator 110 produces the internal computer-generated video signal. Video signal generator may be a TMS9918 or a TMS9928 video display processor available from Texas Instruments. Video signal generator 110 is coupled to a host processor via a bidirectional bus 105 and to video random access memory 120 via a bidirectional bus 115. Video random access memory 120 is not directly connected to the host processor, however the host processor may read data from or write data to video randon access memory via a memory access function of video signal generator 110. Video signal generator 110 receives at clock input 143 and a vertical reset input 144 from digital section 140. In accordance with commands received from the host processor via bus 105, video signal generator 110 reads data from video random access memory 120 and generates three video output signals. These are the luminance signal 111, a red color different signal 112 and a blue color different signal 113. As is well known in the video signal art, these three signals can completely specify a full color video display. Video signal generator 110 in the main recalls data from video random access memory 120 which specifies particular video signals to be generated. However, video signal generator 110 may perform some form of graphics processing in accordance with the signals received from the host processor via bus 105. In such an event, video signal generator 110 may manipulate video images in order to provide the desired video outputs 111 to 113. Thus, video signal generator 110 may produce data for storage within video random access memory 120 via bus 115. On the other hand, the host processor may completely specify the video display to be generated by loading video random access memory 120 via bus 105. In either event, video signal generator 110 produces three video output signals in response to instructions from the host processor via bus 105 in accordance with the data stored within video random access memory 120.

The timing of the operation of video signal generator 110 is controlled by clock signal 143 and vertical reset signal 144. These signals are received from digital section 140. Clock signal 143 controls the rate of pixel generation by video signal generator 110. As is well known in the video signal art, each horizontal line may be thought to be composed of a plurality of individual picture elements or pixels. The total number of such pixels per horizontal video line is specified by video signal generator 110. Video signal generator 110 may either be constructed to produce a fixed number of pixels per line or may be constructed in order to produce a variable number of pixels per line depending upon the mode selected by the host processor via bus 105. In any event, the rate at which individual pixels are produced in controlled by clock signal 143. Because in any selected mode the number of pixels per horizontal line is fixed, clock signal 143 determines the length of time of each horizontal line of the output of video signal generator 110.

In a similar manner, vertical reset signal 144 controls the frame output of video signal generator 110. As is well known in the video art, displays are produced by a series of horizontal lines transmitted sequentially which are ordinarily displayed from top to bottom of the monitor. When the bottom of the display area is reached, a reset signal is produced by the video source, causing the monitor to reset and begin displaying the next received signals at the top of the display. The number of horizontal lines sent to the monitor before this frame reset signal is transmitted determines the vertical resolution of the display. Video signal generator 110 is constructed in order to produce the frame reset signal, for resetting the video monitor upon receipt of the vertical reset signal 144. In addition, in most instances the video signal does not move greatly between individual frames. That is, consecutive frames contain large amounts of the same images. These same images may be produced by similar data stored within video random access memory 120. Therefore, vertical reset signal 144 is also employed by video signal generator 110 to return to the first memory locations within video random access memory 120 corresponding to the images appearing at the top of the screen. In such a manner, video signal generator 110 continuously generates video signals corresponding to relatively slowly varying data within video random access memory 120.

Analog section 130 receives a video signal from video signal generator 110 in the form of luminance signal 111, red color different signal 112 and blue color different signal 113. Analog section 130 also receives an external video input signal 134 in the form of a composite video signal. As known in the video art, a composite video signal includes a combination of a luminance signal and red and blue color different signals quadrature modulated on a color carrier. Analog section 130 receives a gain signal 132 a DC adjust signal 133 and a PAL/NTSC signal 137. Analog section 130 is coupled to a piezoelectric crystal 135 used as a frequency source. As will be discussed below, piezoelectric crystal 135 enables generation of the timing signals by the overlay synchronization system upon external video signal loss. Analog section 130 is further coupled to digital section 140 to output clock signal 137, external synchronization signal 138 and to receive external video loss signal 141 and color burst flag signal 142. Lastly, analog section 136 generates a combined video output signal 136 in the form of a composite video signal.

Analog section 130 performs several major functions. Firstly, it must encode the luminance and color different signals received from video signal generator 110 into the composite video form. This encoding includes generation of a color carrier signal. This color carrier signal is ordinarily generated in phase synchronization with the color burst signal of the external video input signal 134. However, as will be explained in further detail below, this color carrier signal may be derived from piezoelectric crystal 135. Secondly, analog section 136 performs the actual switching between the video signal generated by video signal generator 110 and the external video input signal 134. Lastly, analog section 130 provides the timing standard, derived from the frequency of piezoelectric crystal 135, in the event of loss of external video input signal 134.

Digital section 140 provides major timing and logic functions for the overlay synchronization system. Digital section 140 receives a clock signal 137 and an external synchronization signal 138 from analog section 130. Clock signal 137 is derived from the piezoelectric crystal 135 as modified by the line rate of the external video input signal 134. The external synchronization signal 138 corresponds to the horizontal line synchronization signals received from external video input signal 134. Digital section 140 then produces major timing and logic signals for the rest of the overlay synchronization system. These include a external video loss signal 141 which is applied to analog section 130 and a color burst flag signal 142 which is also applied to analog section 130. As previously mentioned, digital section 140 generates clock signal 143 and vertical reset signal 144 which are applied to video signal generator 110.

Figure 2A:
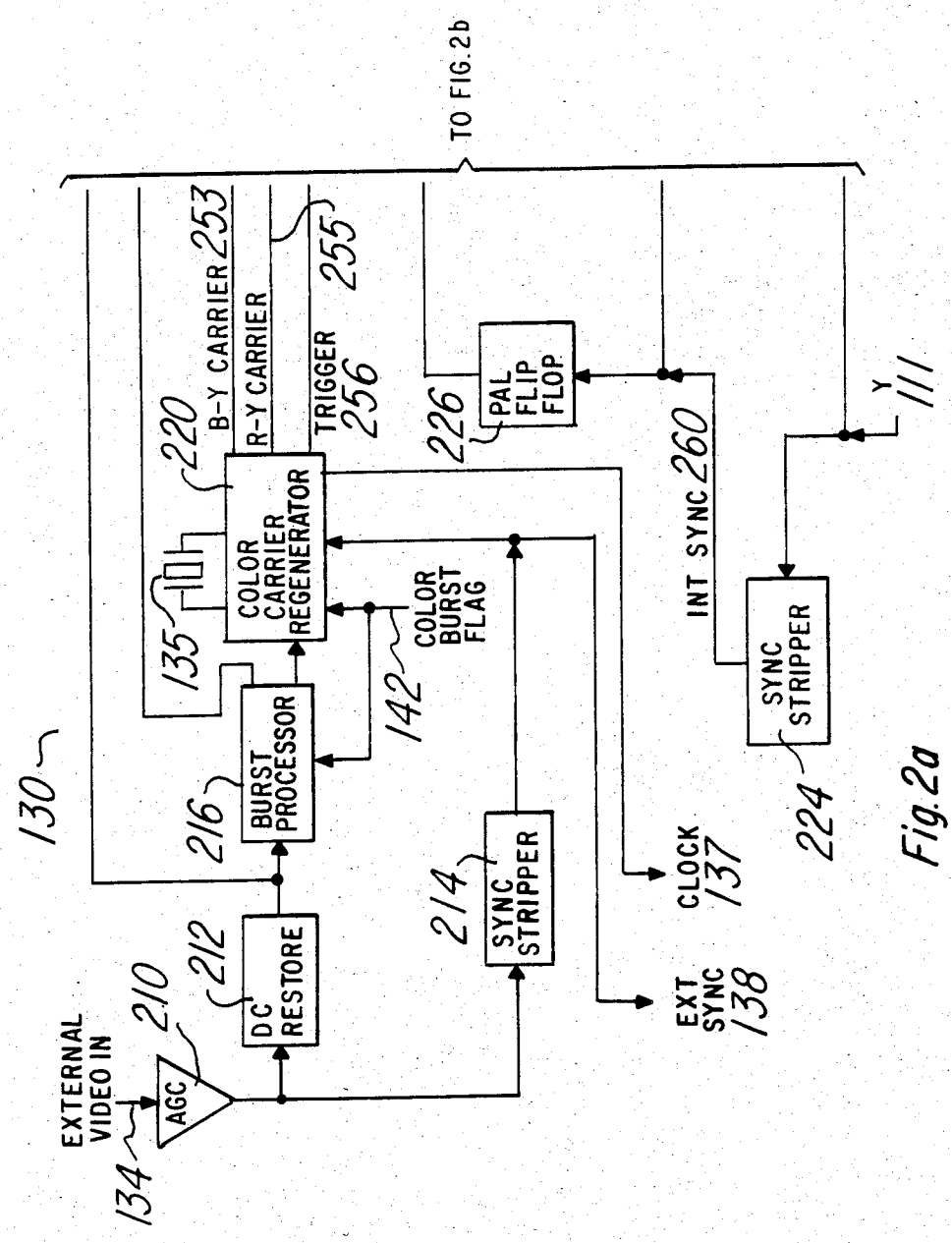
FIG. 2 illustrates a detailed block diagram of the analog section of the synchronization system of the present invention.

FIG. 2 illustrates a detailed block diagram of analog section 130 illustrated in FIG. 1. FIG. 2 includes major sections for processing the received external video input signal 134, encoding the received luminance signal 111, red color different signal 112 and blue color different signal 113 and a major section for switching and post processing of the video signal.

The received external video input signal 134 is first applied to automatic gain control amplifier 210. Automatic gain control amplifier 210 serves to provide an output signal having a restricted range. This restricted range is adapted for the following circuits DC restoration 212 and synchronization stripper 214. DC restoration circuit 212 serves to provide the desired DC bias level for burst processor 216. The output of automatic gain control amplifier 210 is also applied to synchronization stripper 214. Synchronization stripper 214 separates the horizontal and vertical synchronization pulses from the external video input signal by detection of the output level of this signal. As is well known in the video art, the horizontal and vertical synchronization pulses of a composite video signal is outside the range of the picture information signals. Therefore, a properly referenced level detector can separate these synchronization signals from any composite video signal. The output of synchronization stripper 214 is applied to color carrier regenerator 220 and also becomes the external synchronization signal 138. The gain controlled and DC bias adjusted signal from DC restoration circuit 212 is applied to two elements. This external video signal 251 is applied to one portion of video switch 240. Video switch 240 effects the switching between this external video signal 251 and internal video signal 252 generated by elements of analog section 130 as illustrated here in FIG. 2. External video signal 251 is also applied to burst processor 216. Burst processor 216 receives color burst flag signal 142 from digital section 140. Color burst flag signal 142 is a pulse which is active during the color burst portion of each horizontal line of external video input signal 134. As is known in the video art, the color burst signal of each horizontal line serves as the color reference and color carrier for quadrature modulation of the red and blue color different signals.

Figure 3:
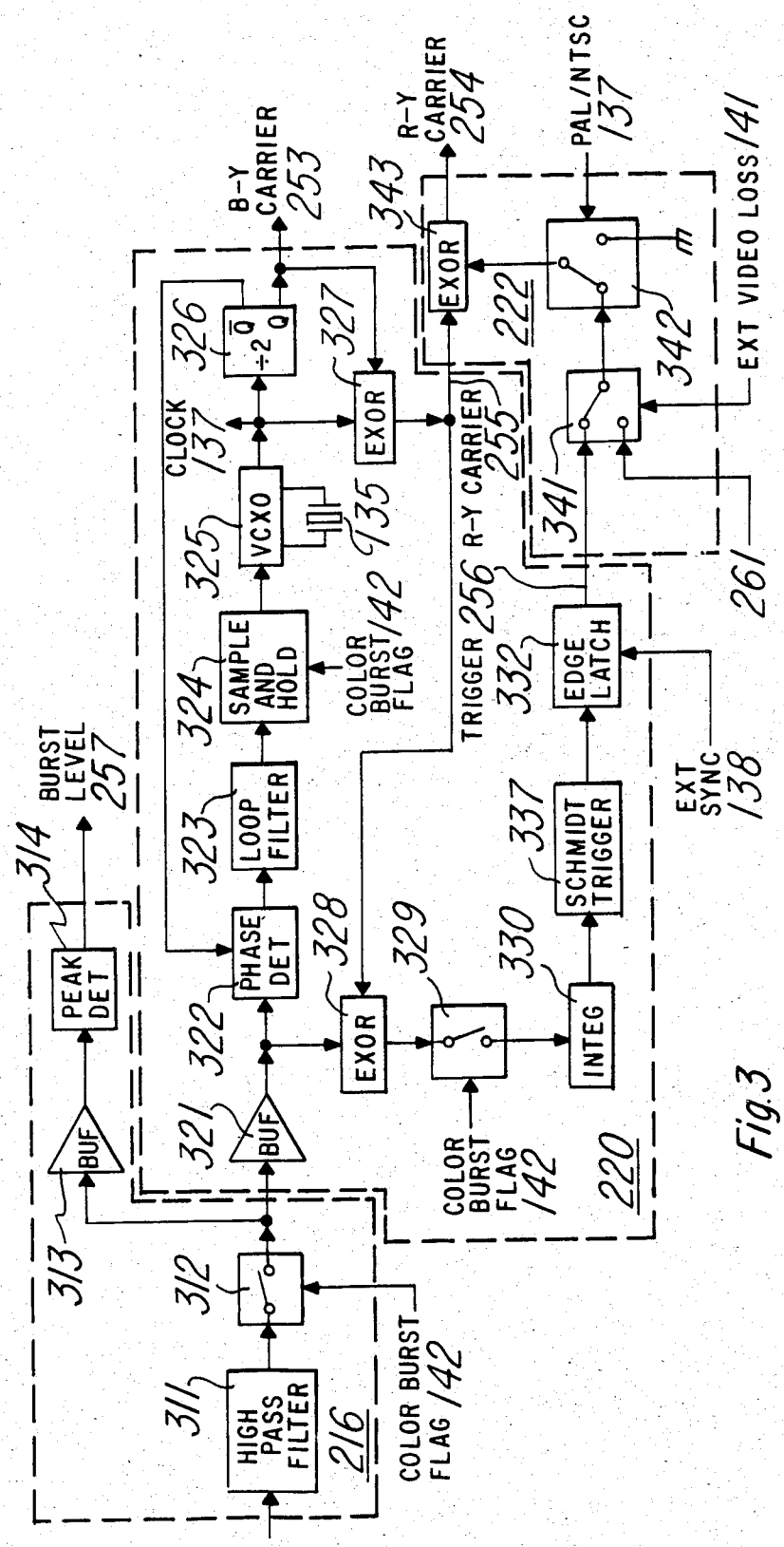
FIG. 3 illustrates further details of the burst detector, color carrier regenerator and PAL switch in accordance with the present invention.

Burst processor 216, which is illustrated in further detail in FIG. 3 includes high pass filter 311, switch 312, buffer amplifier 313 and peak detector 314. High pass filter 311 is constructed to have a low frequency cut off below the color carrier frequency. Switch 312 is closed only during the color burst flag signal 142, thus assuring an output only when the color burst signal is received from external video input signal 134. This switch output is applied directly to color carrier 220 and is also applied to buffer amplifier 313. Buffer amplifier 313 is connected to peak detector 314 which detects the peak level of this color burst signal. This peak level signal 257 is connected to video encoder 230 for use in a manner which will be further described below. Burst processor 216 thus produces one output which is the separated color burst signal from each horizontal line and also produces burst level signal 257 which indicates the amplitude of this color burst signal.

Color carrier regenerator 220 performs the function of generating blue color different carrier 253 and red color different carrier 255. As illustrated in further detail in FIG. 3, color carrier regenerator 220 includes a phase lock loop circuit for generating these color carriers. The sampled color burst signal from burst processor 216 is applied to buffer amplifier 321. The output of buffer amplifier 321 is applied to phase detector 322 and exclusive OR circuit 328.

The phase lock loop circuit of color carrier regenerator 220 includes phase detector 322, loop filter 323, sample and hold circuit 324, voltage controlled crystal oscillator 325 and divider circuit 326. Phase detector 322 detects the difference in phase from the signal received from buffer amplifier 321 and the signal from the not Q output of divider 326. This phase indication signal is applied to loop filter 323 which is designed to reduce noise. Sample and hold circuit 324 is controlled by color burst flag signal 142. Sample and hold circuit 324 thus holds an output level corresponding to the difference in phase between the not Q output of divider 326 and the sampled color burst from buffer amplifier 321. Sample and hold circuit 324 is gated to color burst flag signal 142 in order to insure that its output corresponds to the phase difference when the color burst signal is received from the external video input signal 134. This phase correction signal is then applied to a voltage controlled crystal oscillator 325.

Voltage controlled crystal oscillator 325 is connected to piezoelectric crystal 135. The free running frequency of voltage controlled crystal oscillator 325 is determined by the frequency standard of piezoelectric crystal 135. However, this frequency may be slightly adjusted via the voltage control input and thus may be controlled by the output of sample and hold circuit 324. Note that the ordinary operating frequency of voltage controlled oscillator 325 is twice the color burst frequency. This becomes clock signal 137 which is applied to digital section 140 in accordance with the block diagram of FIG. 1. This frequency is divided by two in divider circuit 326. By this means, a possible phase error of 180° is eliminated. The Q output of divider circuit 326 becomes the blue color different carrier signal 253.

The remaining portions of color carrier regenerator 220 together with PAL switch 222 are employed to generate the red color different carrier signal 254. The overlay synchronization system of the present invention is designed to work with two highly similar but slightly different transmission standards. The first of these is the NTSC (National Television Standard Committee) system which is employed in the United States and Japan. The other of these is the PAL (Phase Alternating Line) system which is widely employed in Europe. These two differing television standards employ the same control signals and the same horizontal line rate. They differ in two major aspects. The NTSC standard employs 30 interlaced frames per second based upon a alternating power line frequency of 60 hertz. The PAL standard employs 25 interlaced frames per second based upon a power line frequency of 50 hertz. This requires that the PAL frames include more horizontal lines than the NTSC frames. The differing number of horizontal lines per frame requires a different rate for the vertical reset signal 144. This matter will be further discussed in the detailed description of the digital section 140. In addition, the PAL standard requires that the red color difference carrier alternate in phase on alternating lines, hence giving the standard its name. Exclusive OR circuits 327 and 328, switch 329, integrater 330, Schmidt trigger 337 and edge latch 332 within color carrier regenerator 220 and PAL switch circuit 222 are employed to generate the red color different carrier in a stable phase for the NTSC standard or in a alternating phase for alternating lines in accordance with the PAL standard.

The basic red color different carrier is generated by exclusive OR circuit 327. Exclusive OR circuit 327 receives as inputs the clock signal 137 and the blue color different carrier 253 from the Q output of divider circuit 326. This generates a carrier signal at the same frequency as the blue color different carrier signal 253 with a phase difference of 90°. This basic phase difference of 90° is the same for both red and blue color difference signals in each of the two standards. However, whereas in the NTSC standard the red color signal is always 90° leading in phase as compared to the blue color different signal, in the PAL standard the red color difference signal alternates between being 90° leading in phase and 90° lagging in phase.

The output of exclusive OR circuit 327 is red color difference carrier signal 255. This is applied to one input of exclusive OR circuit 343 which is a part of PAL switch 222. In the case of the NTSC standard, this exclusive OR circuit 343 passes the color carrier unchanged and produces a red color difference carrier 254 identical to the red color difference carrier 255. In the case of the PAL standard alternating lines are inverted in phase by changing the input to exclusive OR circuit 343.

Exclusive OR 328, switch 329, integrator 330, Schmidt trigger 331 and edge latch 332 detect the phase alteration of the color burst signal in the case of a PAL external video input. The exclusive OR circuit 328 compares the buffered color burst signal from buffer 321 and the 90° phase shifted red color difference carrier 255 from exclusive OR circuit 327. During the color burst time the output of exclusive OR circuit 328 switches depending upon the phase of the color burst signal within alternating lines. Switch 329 couples the output of exclusive or 328 to integrator 330 only during the receipt of the color burst flag signal 142. This ensures that no input is applied to intergrator 330 during other times when the output of exclusive OR 328 is meaningless. Integrator 330, Schmidt trigger 331 and edge latch 332 generate an alternating trigger signal 256 which is applied to PAL switch 222. This is gated by the external synchronization signal 138 which comes from synchronization stripper 214 illustrated in FIG. 2 to insure that this signal switches only during the receipt of an external synchronization signal. Thus trigger signal 256 is alternating in level in alternating lines.

The trigger signal 256 is applied to switch 341 which is a part of PAL switch 222. A second input to switch 341 receives signal 261 from PAL flip flop 226. PAL flip flop receives internal synchronization signal 260 from synchronization stripper 224 which is coupled to the luminance signal 111 from video signal generator 110. PAL flip flop 226 generates a signal on line 261 alternating in level for alternating horizontal lines similar to trigger signal 256. This alternating signal enables generation of a PAL output when the overlay synchronization system is operating on an internal mode which will be described further below. Switch 341 is controlled by the external video loss signal 141. When digital section 140 indicates that the external video input signal 134 is received and valid switch 341 couples trigger signal 256 to switch 342. In the case in which external video loss signal 141 indicates loss of external signal, switch 341 couples the signal on line 261 to switch 342. Thus either an externally controlled or an internally controlled horizontal line alternating signal is applied to one input of switch 342.

The other input to switch 342 is connected to ground. This switch is controlled by PAL/NTSC signal 137 which indicates whether the system is operating in accordance with the PAL standard or the NTSC standard. When operating in accordance with the PAL standard, the alternating signal from switch 341 is applied to exclusive OR circuit 343, thereby causing red color difference carrier 254 to alternate in phase 180° upon alternate horizontal lines. In the case in which the system is operating in accordance with the NTSC standard, switch 342 applies a ground or zero signal to exclusive OR circuit 343. Thus, exclusive OR circuit 343 directly connects red color difference carrier 255 to red color difference signal 254 regardless of the alternating signals output from switch 341.

Figure 4:
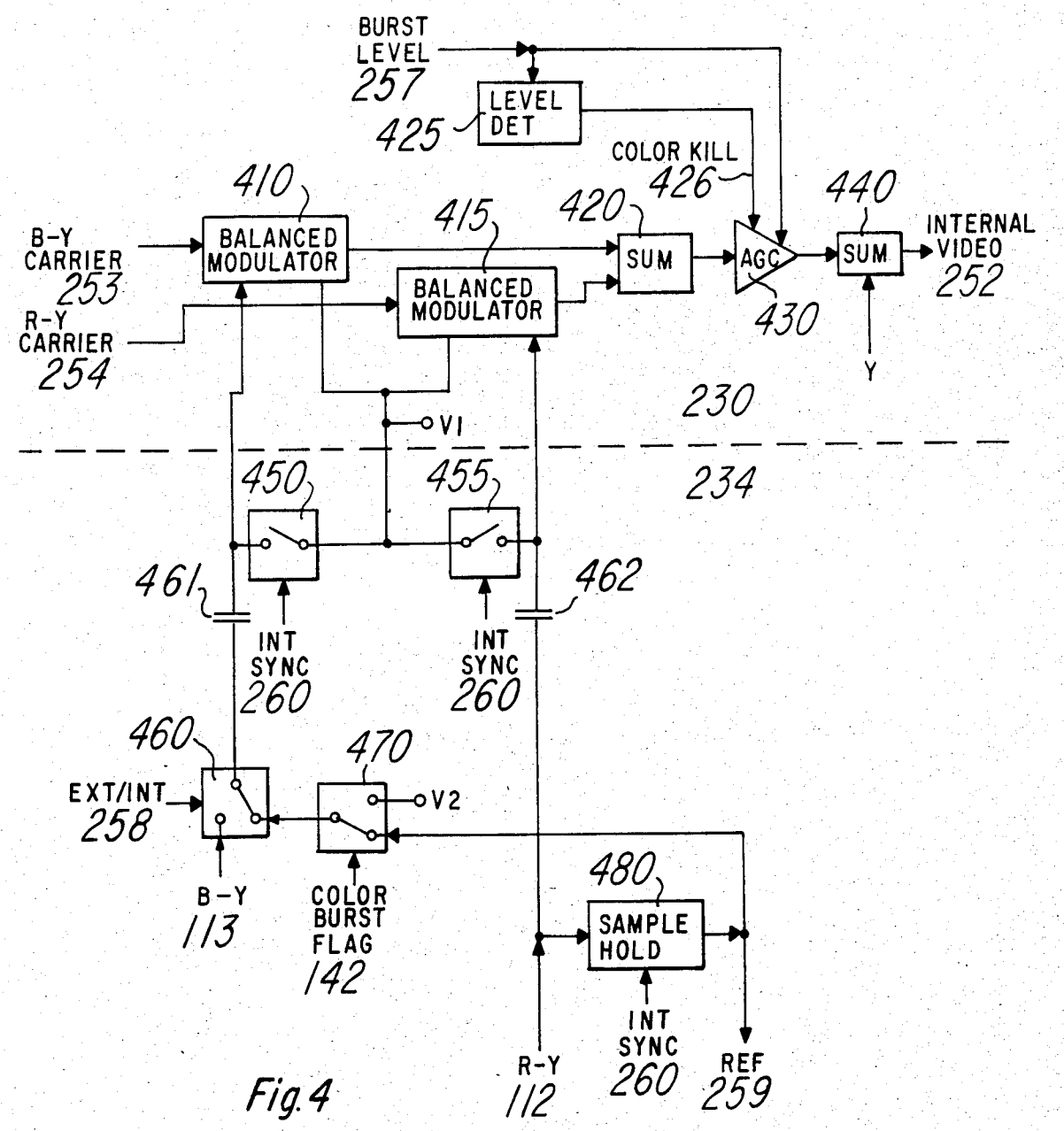
FIG. 4 illustrates further details of the video encoder and the DC restoration/insertion circuit of the present invention.

The blue color difference carrier 253 and the red color difference carrier 254 are applied to video encoder 230 together with the luminance and color difference signals from video signal generator 110 and the burst level signal 257 from burst processor 216. Referring now to FIG. 4, further details of video encoder 230 and DC restoration/insertion circuit 234 are illustrated. Note that the portions of FIG. 4 above the dashed line corresponds to video encoder 230 and those portions below the dashed line correspond to DC restoration insertion circuit 234.

Color encoder 230 receives the blue color difference carrier 253 and the red color difference carrier 254. Blue color difference carrier 253 is applied to balanced modulator 410. Similarly, red color difference carrier signal 254 is applied to balance modulator 415. Balanced modulators 410 and 415 also receive signals to be modulated upon these two carriers. Balanced modulator 410 receives a signal generally corresponding to the blue color difference signal 113 while balanced modulator 415 receives a signal generally corresponding to the red color difference signal 112. These color difference signals are generated by the video signal generator 110 illustrated in FIG. 1.

The details of the DC restoration insertion circuit 234 are necessitated by the manner in which video signal generator 110 signals to analog section 130 the need to switch between the external and the internal signals. In accordance with the subject matter disclosed in U.S. Pat. No. 4,374,395 entitled "VIDEO SYSTEM WITH PICTURE INFORMATION AND LOGIC SIGNAL MULTIPLEXING" by Carlo L. Herman and Granville E. Ott issued on Feb. 15, 1983, and assigned to the same assignee as the present application, the blue color difference signal is employed to indicate whether the internal or the external video source is to be output. Note in this regard that the present application is similar to the embodiment illustrated in FIG. 3 in the above mentioned U.S. Pat. No. 4,374,395. Although the switching signal in the above mentioned patent appears on both the red and the blue color difference signals, the present invention uses this switching signal only on the blue color difference signal. Thus when the overlay system is to be in external mode, the blue color difference signal 113 is at the synchronization level which is outside of the normal range of picture signals.

Although the preferred embodiment of the present invention employs one of the color difference signals to control the output of the internal or external video signal, it should be understood that the principles of synchronization of the internal video signal to the external video signal does not require this manner of switching. It should be understood that the host computer could directly generate the external/internal signal 258 through an additional input to analog section 130. The invention would work equally well no matter what structure controlled the output of the internal or external video signal.

Referring again to FIG. 2, comparator 244 receives blue color difference signal 113 and reference signal 259 and generates an output which is the external/internal signal 258. This external/internal 258 is applied to DC restoration/insertion circuit 234 and also to video switch 240 to affect the video switching. Reference signal 259 is generated by sample and hold circuit 480 illustrated in FIG. 4. Sample and hold circuit 480 samples the red color difference signal 112 applied to DC restoration/insertion circuit 234 during the time of the internal synchronization signal 260. Internal synchronization signal 260 is generated by synchronization stripper 224 which has the luminance signal 111 as its input. The red color difference signal is at the no color level during the synchronization interval and therefore this no color level appears as reference signal 259. Reference signal 259 is also applied to one input of switch 470.

The other input of switch 470 is connected to a voltage source V2 which is selected to be the level of the blue color difference signal during the color burst interval. Switch 470 is controlled by color burst flag signal 142. Switch 470 is ordinarily connected to reference signal 259. However, during the color burst flag signal 142, it is connected to the voltage source V2. The output of switch 470 is connected to one input of switch 460. The other input of switch 460 is the blue color difference signal 113. Switch 460 is controlled by the external/internal signal 258 from comparator 244. During any time in which the external signal is to be output from analog section 130, switch 460 couples the output of switch 470 to DC restoration capacitor 461. During these intervals, the blue color difference signal 113 is at the synchronization level, which is outside the ordinary picture range. Switch 460 serves to couple a voltage within the picture range to balanced modulator 410 during these intervals. This is necessary in order to prevent jamming up of balanced modulator 410 by this signal outside its normal input range.

In a similar manner, red color difference signal 112 is coupled to balanced modulator 415 through a DC restoration capacitor 462. The other inputs of each of balance modulators 410 and 415 are connected to the voltage source V1. Voltage source V1 is selected as the same as the no color level of the red and blue color difference signals. Switches 450 and 455 coupled this no color level to the opposite inputs of balance modulators 410 and 415 during the internal synchronization signal 260. This is also done to prevent jam up of the balanced modulators.

The output of balanced modulator 410 and balanced modulator 415 are added in summer 420. Because the red and blue color difference signals are modulated on carriers having phases 90° apart, this summing does not lose any of the information. The output of summer 420 is applied to automatic gain control amplifier 430. Automatic gain control amplifier 430 receives two control signals; color kill signal 426 and gain control signal 431.

The burst level signal 257 from burst processor 216 is applied to level detector 425. Level detector 425 determines whether or not the burst level signal 257 is below a predetermined level. In the event that the burst level signal is detected as below this predetermined level, level detector 425 generates color kill signal 426 which cuts off automatic gain control amplifier 430. The burst level signal 257 would be below this predetermined threshold if the external video control signal were a monochrome signal, in which case there would be no color burst signal at all, or in the case that the color burst signal is so degraded that it is incapable of providing the necessary color phase information for the monitor. In such an event, it is advantageous to restrict the internally generated video signal from video signal generator 110 to also be a monochrome signal in order to prevent uncontrolled colors appearing on the monitor.

Burst level signal 257 controls the gain of the automatic gain control amplifier 430. It is known in the video art that the color saturation levels displayed in a video monitor are derived by comparing the amplitude of the color difference signal and the color burst signal. By employing the burst level signal 257 to control the gain of automatic gain control amplifier 430, the internally generated video signal will have the same relative red and blue difference signal levels. This is advantageous in order to provide the same color saturation ranges for both the internal and the external video signals.

Summer 440 receives the modulated color signals from automatic gain control amplifier 430 and the luminance signal from DC restoration circuit 232. This sum of the choromance signals and the luminance signals produced by summer 440 is internal video signal 252. In accordance with the video art, this kind of signal is known as a composite video signal, which is of the same type as the external video input 134.

Referring again to FIG. 2, external video signal 251 and internal video signal 252 are both applied to video switch 240. Video switch 240 normally applies the external video signal 251 to buffer amplifier 250. Video switch 240 is controlled by a pair of signals, external video loss signal 141 and external/internal signal 258. External/internal 258 is ordinarily in a state indicating the external mode. In this state external video signal 251 is applied to buffer amplifier 250. In the event that external/internal signal 258 indicates an internal mode then video switch 240 applies internal video signal 252 to buffer amplifier 250. In either event, when loss of external video signal is indicated by external video loss signal 141 then video switch 240 is switched to the internal mode.

Buffer amplifier 250 receives the output from video switch 240 and provides the composite video output signal 136. Buffer amplifier 250 has its gain controlled by gain input 132 and its DC bias controlled by DC adjust signal 133. Thus analog section 130 provides through buffer amplifier 250 a means for controlling the amplitude and DC bias of the video output signal 136.

Figure 5:
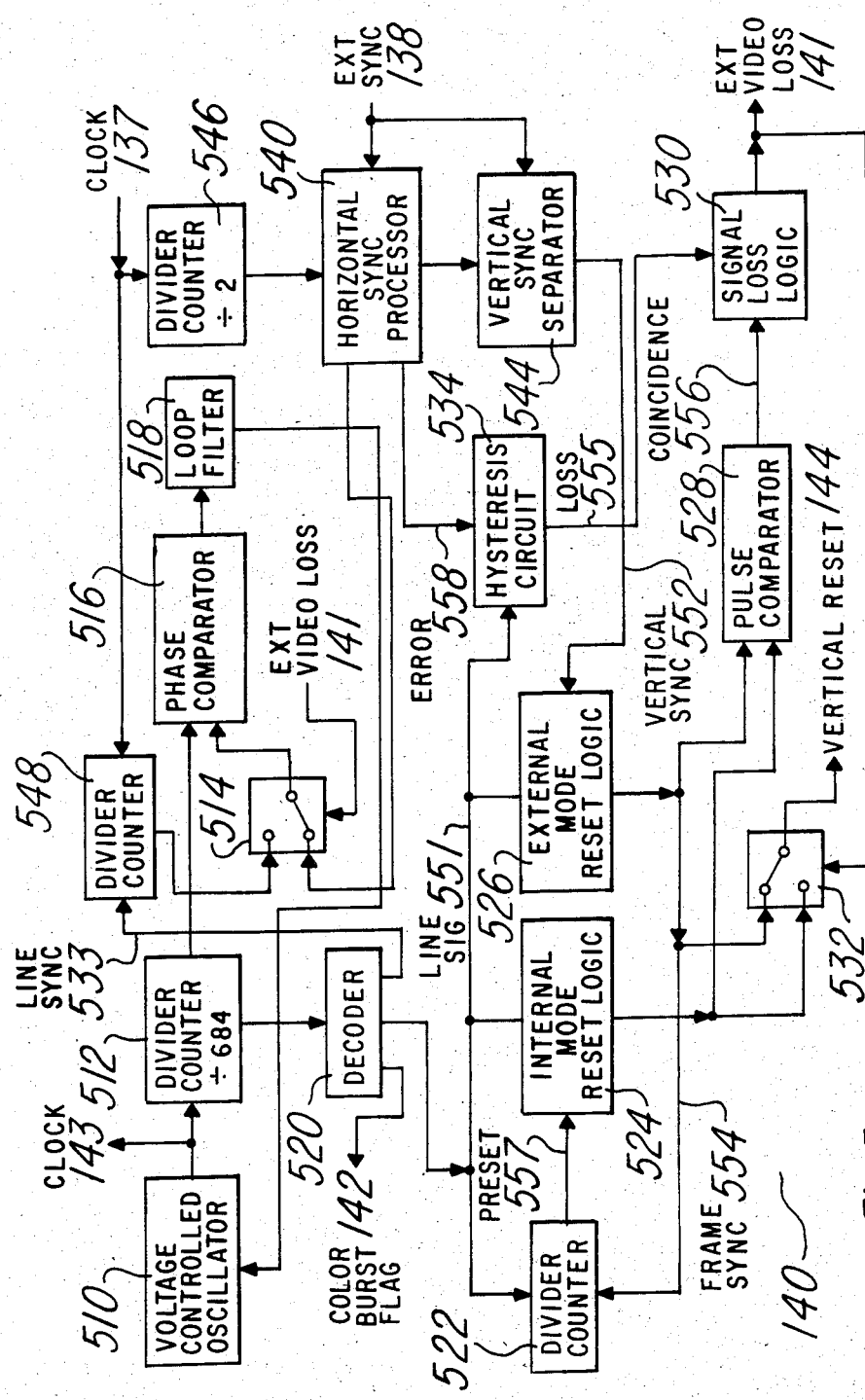
FIG. 5 illustrates a detailed block diagram of the digital section of the synchronization system in accordance with the present invention.

FIG. 5 is a detailed block diagram of the construction of digital section 140 illustrated in FIG. 1. Digital section 140 provides the major timing and logic functions for the overlay synchronization system. Digital section 140 receives from the analog section clock signal 137, which is twice the color burst frequency, and external synchronization signal 138. Digital section 140 then in turn applies external video loss signal 141 and color burst flag signal 142 back to analog section 130. In addition, digital section 140 generates clock signal 143 and vertical reset signal 144 which are applied to the video signal generator 110.

The timing functions of the digital section 140 are ordinarily tied to the external synchronization signal 138. The external synchronization signal 138 is applied to horizontal synchronization processor 540. Referring back to FIG. 2, the external synchronization signal 138 is generated by synchronization stripper 214. As described above, synchronization stripper 214 distinguishes between signals within the ordinary picture range and signals outside this range which includes both horizontal and vertical synchronization signals. Because synchronization stripper 214 provides only level detection, it is necessary to separate horizontal synchronization signals from vertical synchronization signals.

Horizontal synchronization processor 540 receives the raw external synchronization signal 138 and also a clock signal from divider counter 546. Divider counter 546 receives clock signal 137 from the analog section 130 and divides this signal by two. As will be remembered, clock signal 137 is twice the color burst frequency. Therefore, the output of divider counter 546 equals the color burst frequency. Horizontal synchronization processor 540 includes a counter which counts the color burst frequency upon receipt of the leading edge of the external synchronization signal 138. Horizontal synchronization processor 540 provides an output to switch 514 upon receipt of this leading edge which is reset when a predetermined count is complete. This technique serves to produce a fixed duty cycle signal corresponding to horizontal synchronization pulses and to eliminate the equalizing pulses and the seration pulses which are a part of the synchronization signal of the composite video signal. In order to prevent sensitivity to any extraneous signals which occur at times other than the horizontal synchronization pulses, the counter within horizontal synchronization processor 540 is made insensitive to further signals until a predetermined window count is reached. This window count is selected to provide sensitivity to synchronization pulses at a time shortly prior to the expected time of receipt of the next horizontal synchronization pulse. As a result, the signal output to switch 514 is a series of pulses at the line frequency of the external video signal.

Horizontal synchronization processor 540 is employed to regularize the horizontal synchronization pulses received from external synchronization signal 138. This includes insertion of horizontal synchronization pulses in the case when a few horizontal synchronization pulses are missing from the external synchronization signal 138 and for indicating any loss of horizontal synchronization pulses from the external video signal. In the event that the next horizontal synchronization pulse is not received from external synchronization signal 138 after a predetermined overflow count is reached, the counter is reset. This overflow count is selected to insure an interval somewhat longer than the normal horizontal line interval from the last received horizontal synchronization signal. This begins the production of the pulse signal to switch 514 in the same manner as when the expected horizontal synchronization signal is received. Thus the horizontal synchronization processor 540 produces an insert pulse to substitute for the missing horizontal synchronization pulse. Thus an error causing the loss of one or a few horizontal synchronization pulses is supplied by horizontal synchronization processor 540.

Horizontal synchronization processor 540 also generates an error signal 558. This error signal 558 is applied to hysteresis circuit 534. Error signal 558 indicates when horizontal synchronization signals are lost. This occurs when the counter must be reset by the predetermined overflow count rather than by the receipt of a horizontal synchronization pulse. The use of this error signal 558 will be further detailed below.

A phase lock loop including voltage controlled oscillator 510, divider counter 512, phase comparator 516 and loop filter 518 is employed to generate clock signal 143 for application to video signal generator 110. During periods when external video input signal 134 is present, switch 514 applies the horizontal pulses from horizontal synchronization processor 540 to phase comparator 516. The other input of phase comparator 516 is derived from divider counter 512. The phase difference signal from phase comparator 516 is filtered via loop filter 518. The output of loop filter 518 controls the frequency of oscillation of voltage controlled oscillator 510. The free running frequency of voltage controlled oscillator 510 is selected to be approximately 684 times the expected horizontal line frequency. The output of voltage controlled oscillator 510 is clock signal 143 which is applied to video signal generator 110. The output of voltage control oscillator 510 is also divided by a factor of 684 by divider counter 512. This subfrequency signal is applied to one input of phase comparator 516.

Video signal generator 110 is constructed to receive a pixel clock signal which determines the rate of pixel generation. Internal to video signal generator 110 are control circuits which control the rate of horizontal line generation based upon this pixel clock frequency. The phase lock loop including voltage controlled oscillator 510, divider counter 512, phase comparator 516 and loop filter 518 adjusts the frequency of clock signal 143 to be a predetermined multiple of the line frequency of the external video signal. This frequency relationship (a factor of 684 set by divider counter 512) causes the video signal generator 110 to generate the horizontal lines in synchronism with the horizontal lines of external video input signal 134. As a result of this processing, clock signal 143 is adjusted in a manner that allows video signal generator 110 to follow any time base errors in the horizontal line frequency from external video input 134. Thus external video input signal 134 can be slightly off the standard frequency, or may be varying slowly around the standard frequency and the video lines generated by video signal generator 110 will follow. This feature is highly important as it prevents the relative motion on the display monitor of the external video signal and the internal video signal.

In the event that the external video input signal 134 is lost, clock signal 143 is generated based upon a differing standard. Switch 514 is controlled by external video loss signal 141. In the event that the external video input signal 134 is lost, switch 514 applies the signal from divider counter 548 to phase comparator 516. Divider counter 548 receives as its input clock signal 137. As will be remembered, clock signal 137 is set at twice the color burst signal. Divider counter 548 divides this clock signal 137 by a factor, thereby deriving a signal which is the color burst frequency. In accordance with the NTSC standards, the color burst frequency is 227.5 times the horizontal line frequency, therefore the factor of divider counter 548 is 455. Similarly in the PAL standard the factor is 568 to yeild 284 cycles of the color burst carrier per horizontal line. This signal is applied to phase comparator 516 via switch 514 as a substitute for the horizontal line pulses from horizontal synchronization processor 540 during a condition of signal loss. As can be appreciated from a study of FIG. 3, during a period of loss of external video input signal 134, clock signal 137 is at the frequency set by piezoelectric crystal 135. Therefore, when the overlay synchronization system of the present invention is forced to go into internal mode, the frequency of clock signal 143 is set by the frequency of piezoelectric crystal 135. This provides a stable standard for generating the video output signal 136 from the internal signal alone during a period of external video signal loss. In order to retain line synchronization with the external source, at least initially, divider counter 548 is reset by the line synchronization signal 553 from decoder 520. Decoder 520 decodes the state of divider counter 512 in order to generate this line synchronization signal 553.

Decoder 520 produces additional signals which are employed in the operation of digital section 140. Decoder 520 produces color burst flag signal 142. Color burst flag signal 142 is active only during the expected time of the external color burst. In accordance with the video signal standards, the color burst occurs prior to each horizontal line at a fixed time. Thus by setting the color burst flag signal at a particular count of divider counter 512 and resetting it at a later count, this signal may be made to coincide with the expected color burst from the external video input signal 134.

Decoder 520 also generates line signal 551 which is supplied to several circuits in the signal loss and vertical reset generating portion of digital section 140. Line signal 551 is applied to divider counter 522, internal mode reset logic 524, external mode reset logic 526 and hysteresis circuit 534. Hysteresis circuit 534 counts the line signals 551 each time that horizontal synchronization pulse signal is lost as indicated by error signal 558. In the event that error signal 558 indicates loss of horizontal synchtonization pulses for eight horizontal lines as indicated by a line signal 551, then hysteresis circuit 534 causes loss signal 555 to be active.

As mentioned above, it is believed desirable for horizontal synchronization processor 540 to supply any missing any horizontal synchronization pulses in the case where only a few horizontal pulses are missing. It is believed that horizontal synchronization processor 540 will be close enough to the desired horizontal line frequency to remain stable for loss of only a few of the external horizontal synchronization pulses. Therefore, the overlay synchronization system does not switch to internal mode for loss of less than eight horizontal synchronization pulses in a row. On the other hand, hysteresis circuit 534 indicates via loss signal 555 when greater than eight horizontal synchronization pulses in a row are missing. This loss signal 555 is applied to signal loss logic 530 which then causes external video loss signal 141 to be active. With external video loss signal 141 active, the overlay synchronization system switches to internal mode. It should be noted that in accordance with FIG. 2, video switch 240 couples internal video signal 252 to video output 136 when external video loss signal 141 is active.

Line signal 551 is also applied to various portions of the vertical reset logic. Divider counter 522 divides the line signal 555 by a factor corresponding to the number of lines per interlace frame. This submultiple frequency is applied to internal mode reset logic 522 via preset signal 557. Internal mode reset logic 524 is set via preset signal 557 and generates an output in synchronism with line signal 551 when preset signal 557 is present. In a similar manner, external mode reset logic receives line signal 551 and vertical synchronization signal 552. Vertical synchronization signal 552 is derived from vertical synchronization separator 544 and corresponds to the vertical reset signal of the external video input signal 134. Note that vertical synchronization separator 544 receives a timing trigger signal from horizontal synchronization processor 540, from its counter, in order to insure that the vertical synchroniztion signal is coincident with the horizontal synchronization signal and not tirgger by any extraneous noise. Upon being set by a vertical synchronization signal 552, external mode reset logic 526 passes line 551 to its output.

Internal mode reset logic 524 and external mode reset logic 526 are applied to the two inputs of switch 532. Switch 532 ordinarily applies the output of external mode reset logic 526 to its output as vertical reset signal 144. As shown in FIG. 1, vertical reset signal 144 is applied to video signal generator 110. By gating vertical synchronzation signal 552 with line signal 551 derived from decoder 520 when in external mode, vertical reset signal 144 is assured to occur at the proper time within a horizontal line in order to properly reset video signal generator 110. Note that the output of external mode reset logic 526 is applied to reset divider counter 522 via frame synchronization signal 554. This insures that internal mode reset logic 524 and external mode reset logic 526 are in phase synchronization when external synchronization signal 138 enables generation of video synchronization signal 552.

Switch 532 is controlled by external video loss signal 141. In the event that signal loss logic 530 generates external video loss signal 541, then switch 532 causes vertical reset signal 144 to come from internal mode reset logic 524. The output of internal mode reset logic 524 and external mode reset logic 526 are both applied to pulse comparator 528. Pulse comparator 528 generates a coincidence signal 556 when these reset signals are in coincidence. This coincidence signal is applied to signal loss logic 530. In the event of external signal loss of longer than eight lines as indicated by loss signal 555, signal loss logic 530 causes external video loss signal 141 to be active. Hysteresis circuit 534 does not switch loss signal 555 back to normal mode upon immediate reappearance of the external signal. On the contrary, loss signal 555 remains active until 2048 consecutive horizontal synchronization pulses are correctly received. This insures that the external video signal 134 is reliably received. In addition signal loss logic 530 remains in internal mode until a condition in addition to the resetting of loss signal 555 is satisfied. The internal mode reset signal must be in time coincidence with the external mode reset signal as determined by the coincidence signal 556 generated by pulse comparator 528. If the internal mode reset signal and the external reset signal are not in time coincidence, then switching to external mode would ordinarily cause the monitor to lose picture lock and cause it to roll.

The count of divider counter 522 is selected to cause slightly shorter frames in internal mode than the applicable television standard. Note that divider counter 522 may be made responsive to PAL/NTSC signal 137 in order to properly select the necessary count or digital section 140 may be constructed in two types with differing counts for divider counter 522 dependent upon the standard selected. For the NTSC standard divider counter 522 should count to 261, while the count should be 312 for PAL. This causes the frame rate to have a frequency different in internal mode than in external mode enabling the reset signals from internal mode reset logic 524 in external mode reset logic 526 to come into alignment. Only upon the two conditions of a predetermined number of correctly received horizontal synchronization pulses and reset coincidence does signal loss logic 530 then switch back to external mode.

In the foregoing description of the preferred embodiment of the invention, a video overlay system having an internal video source synchronized to an external video source is dieclosed. In accordance with the preferred embodiment of the present invention, the internal video source is controlled in both horizontal line rate and in vertical frame rate in order to match the rates of the external source. Switching between the two video sources can be made without fear of loss of picture lock in the viewing monitor and without fear of picture movement. When the external video signal is lost for any reason, a stable picture is continued solely from the internal video signal. In addition the transistion from internal mode to external mode is controlled in order to achieve maximum picture stability. The present invention is therefore highly advantageous in insuring picture stability when overlaying one video source upon another.

I claim:

1. A video signal mixing system comprising:
   an input means for receiving an external composite video signal:
   a horizontal synchronization pulse detecting means connected to said input means for detecting the horizontal synchronization pulses of said first composite video signal;
   an external signal loss detector connected to said input means for detecting and indicting the loss for longer than a first predetermined period of time greater than the period of said horizontal synchronization pulses the loss of said external composite video signal;
   a video clock frequency standard for determining a frequency;
   a video clock signal generating means connected to said horizontal synchronization pulse detecting means and said external signal loss detector for generating a video clock signal, said video clock signal generating means having
      a horizontal phase lock loop means connected to said horizontal synchronization pulse detecting means including a horizontal controlled oscillator for generating internal horizontal synchronization pulses in phase synchronization with said detected horizontal synchronization pulses, and
      a video clock phase lock loop means connected to said horizontal phase lock loop means and said video clock frequency standard including a video clock controlled oscillator for generating said video clock signal having a frequency corresponding to and corrected by the frequency of said internal horizontal synchronization pulses when said external signal loss detector does not indicate the loss of said external composite video signal and having a frequency corresponding to said frequency determined by said video frequency standard when said external signal loss detector indicates loss of said external composite video signal, whereby momentary loss of said external composite video signal for a time less than said predetermined period of time causes said frequency of said video clock signal to be controlled by said horizontal controlled oscillator;
   a video signal generating means connected to said video clock signal generating means for generating an internal composite video signal in synchronization with said video clock signal thereby generating said internal composite video signal having horizontal lines in synchronism with said detected horizontal synchronization pulses; and
   a video switching means connected to said input means, said external signal loss detector and said video signal generating means having an output means for selectively connecting either said external composite video signal or said internal composite video signal to said output means, said video switching means selecting said internal composite video signal when said external signal loss detector indicates loss of said external composite video signal, whereby said output means receives a combined video signal having synchronized horizontal lines.

2. A video signal mixing system as claimed in claim 1, wherein:
   said external signal loss detector is further connected to said horizontal phase lock loop means for indicating external signal loss when said horizontal phase lock loop means loses phase lock on said detected horizontal synchronization pulses for more than a predetermined number greater than one of internal horizontal synchronization pulses.

3. A video signal mixing system as claimed in claim 2, further including:
   a vertical synchronization signal detecting means connected to said input means for detecting the vertical synchronization signal of said external composite video signal;
   a video reset signal generating means connected to said vertical synchronization signal detecting means for generating a video reset signal in synchronization with said detected vertical synchronization signal; and
   said video signal generating means being further connected to said video reset signal generating means for generating said internal composite video signal having frames in synchronism with said detected video reset signal.

4. A video signal mixing system as claimed in claim 3, wherein:
   said video reset signal generating means being further connected to said video clock phase lock loop means for generating said video reset signal at a frequency corresponding to said frequency of said video clock frequency standard upon indication of the loss of said external composite video signal.

5. A video signal mixing system as claimed in claim 4, wherein:
   said external signal loss detector continues to indicate external signal loss for a second predetermined time after said external composite video signal is restored, said second predetermined period of time being longer than said first predetermined period of time.

6. A video signal mixing system as claimed in claim 5, wherein:

said external signal loss detector is further connected to said vertical synchronization signal detecting means and said video reset signal generating means for ceasing to indicate external signal loss upon simultaneous receipt of said detected vertical synchronization signal and said video reset signal for a predetermined number of times.

7. A video signal switching system as claimed in claim 2, wherein:
said predetermined number of internal horizontal synchronization pulses is 8.

8. A video signal mixing system comprising:
an input means for receiving an external composite video signal;
a horizontal synchronization pulse detecting means connected to said input means for detecting the horizontal synchronization pulses of said external composite video signal;
a color burst amplitude detector connected to said input means for detecting the amplitude of the color burst of said external composite video signal;
a video signal generating means connected to said horizontal synchronization pulse detecting means and said color burst amplitude detector for generating a internal composite video signal having horizontal lines in synchronism with said detected horizontal synchronization pulses and having color modulation corresponding to said detected amplitude of said color burst of said external composite video signal, whereby said internal composite video signal has the same color saturation as said external composite video signal; and
a video switching means connected to said input means, and said video signal generating means having an output means for selectively connecting either said external composite video signal or said internal composite video signal to said output means, whereby said output means receives a combined video signal having synchronized horizontal lines.

9. A video signal mixing system as claimed in claim 8, wherein:
said color burst amplitude detector further detects when the amplitude of said color burst of said external composite video signal is below a predetermined level; and
said video signal generating means further includes means for generating said internal composite video signal without color modulation thereby producing a monochrome video signal when the amplitude of said color burst of said external composite video signal is below said predetermined level.

10. A video signal mixing system comprising:
a first input means for receiving a first composite video signal;
a horizontal synchronization pulse detecting means connected to said first input means for detecting the horizontal synchronization pulses of said first composite video signal;
a first composite video signal loss detector connected to said first input means for detecting and indicating the loss for longer than a first predetermined period of time greater than the period of said horizontal synchronization pulses the loss of said first composite video signal;
a video clock frequency standard for determining a frequency;

a video clock signal generating means connected to said horizontal synchronization pulse detecting means and said first composite video signal loss detector for generating a video clock signal for enabling generation of a second video signal having horizontal lines synchronized with said detected horizontal synchronization pulses, said video clock signal generating means having
a horizontal phase lock loop means connected to said horizontal synchronization pulse detecting means including a horizontal controlled oscillator for generating internal horizontal synchrnization pulses in phase synchronization with said detected horizontal synchronization pulses, and
a video clock phase lock loop means connected to said horizontal phase lock loop means and said video clock frequency standard including a video clock controlled oscillator for generating said video clock signal having a frequency corresponding to and corrected by the frequency of said internal horizontal synchronization pulses when said first composite video signal loss detector does not indicate the loss of said first composite video signal and having a frequency corresponding to said frequency determined by said video frequency standard when said first composite video signal loss detector indicates loss of said first composite video signal, whereby momentary loss of said first composite video signal for a time less than said predetermined period of time causes said frequency of said video clock signal to be controlled by said horizontal controlled oscillator;
a second input means for receiving a second video signal having a luminance signal and two color difference signals;
a video encoding means connected to said video clock phase lock loop and said second input means for generating a second composite video signal from said luminance signal and said two color difference signals; and
a video switching means connected to said first input means, said first composite video signal loss detector and said video encoding means having an output means for selectively connecting either said first composite video signal or said second composite video signal to said output means, said video switching means selecting said second composite video signal when said first composite video signal loss detector indicates loss of said first composite video signal, whereby said output means receives a combined video signal having synchronized horizontal lines.

11. A video signal mixing system as claimed in claim 10, wherein:
said first composite video signal loss detector is further connected to said horizontal phase lock loop means for indicating first composite video signal loss when said horizontal phase lock loop means loses phase lock on said detected horizontal synchronization pulses for more than a predetermined number greater than one of internal horizontal synchronization pulses.

12. A video signal mixing system as claimed in claim 11, further including:
a vertical synchronization signal detecting means connected to said input means for detecting the vertical synchronization signal of said first composite video signal; and a video reset signal generating means connected to said vertical synchronization signal detecting means for generating a video reset signal in synchronism with said internal vertical synchronization signal for enabling generation of said second video signal having frames in synchronism with said detected video synchronization signal.

13. A video signal mixing system as claimed in claim 12, wherein:

said video reset signal generating means being further connected to said video clock phase lock loop means for generating said video reset signal at a frequency corresponding to said frequency of said video clock frequency standard upon indication of the loss of said first composite video signal.

14. A video signal mixing system as claimed in claim 13, wherein:

said first composite video signal loss detector continues to indicate first composite video signal loss for a second predetermined time after said first composite video signal is restored, said second predetermined period of time being longer than said first predetermined period of time.

15. A video signal mixing system as claimed in claim 14, wherein:

said first composite video signal loss detector is further connected to said vertical synchronization signal detecting means and said video reset signal generating means for ceasing to indicate first composite video signal loss upon simultaneous receipt of said detected vertical synchronization signal and said video reset signal for a predetermined number of times.

16. A video signal mixing system as claimed in claim 13, further including:

a color burst phase lock loop means connected to said input means having a color burst controlled oscillator with a stable free running frequency for generating an internal color carrier signal in phase synchronism with said color burst signal of said first composite video signal;

said video signal generating means is further connected to said color burst phase detector for generating said second composite video signal with color modulation corresponding to said internal color carrier signal, whereby said second composite video signal has the same color hue as said first composite video signal; and said video clock frequency standard is connected to said color burst phase detector for generating said video clock signal and said video reset signal as subfrequencies of said internal color carrier signal.

17. A video signal switching system as claimed in claim 11, wherein:

said predetermined number of internal horizontal synchronization pulses is 8.

18. A video signal mixing system comprising:

a first input means for receiving a first composite video signal;

a horizontal synchronization pulse detecting means connected to said first input means for detecting the horizontal synchronization pulses of said first composite video signal;

a color burst amplitude detector connected to said input means for detecting the amplitude of the color burst of said first composite video signal;

a second input means for receiving a second video signal having a luminance signal and two color difference signals;

a video encoding means connected to said horizontal synchronization pulse detecting means, said second input means and said color burst amplitude detector for generating a second composite video signal from said luminance signal and said two color difference signals having horizontal lines in synchronism with said detected horizontal synchronization pulses and having color modulation corresponding to said detected amplitude of said color burst of said first composite video signal, whereby said second composite video signal has the same color saturation as said first composite video signal; and a video switching means connected to said input means, and said video encoding means having an output means for selectively connecting either said first composite video signal or said second composite video signal to said output means, whereby said output means receives a combined video signal having synchronized horizontal lines.

19. A video signal mixing system as claimed in claim 18, wherein:

said color burst amplitude detector further detects when the amplitude of said color burst of said first composite video signal is below a predetermined level; and said video encoding means further includes means for generating said second composite video signal without color modulation thereby producing a monochrome video signal when the amplitude of said color burst of said first composite video signal is below said predetermined level.

20. A video signal mixing system comprising:

a first input means for receiving a first composite video signal;

a horizontal synchronization pulse detecting means connected to said first input means for detecting the horizontal synchronization pulses of said first composite video signal;

a video clock signal generating means connected to said horizontal synchronization pulse detecting means for generating a video clock signal having a frequency corresponding to the frequency of said detected horizontal synchronization pulses for enabling generation of a second video signal having horizontal lines synchronized with said detected horizontal synchronization pulses;

a second input means for receiving a second video signal having a luminance signal and two color difference signals;

a video encoding means connected to said video clock signal generating means and said second input means for generating a second composite video signal from said luminance signal and said two color difference signals;

a video switching means connected to said input means, and said video encoding means having an output means for selectively connecting either said first composite video signal or said second composite video signal to said output means, whereby said output means receives a combined video signal having synchronized horizontal lines; and said video mixing system being embodied in two integrated circuits, a first analog integrated circuit including said first input means, said second input means, said video encoding means and said video switching means and a second digital integrated circuit including said horizontal synchronization pulse detecting means and said video clock signal generating means.

* * * * *